United States Patent [19]

Hurford, Jr.

[11] Patent Number: 4,832,237

[45] Date of Patent: May 23, 1989

[54] ADAPTER ASSEMBLY FOR STORAGE CONTAINERS

[75] Inventor: Hadley M. Hurford, Jr., Mayfield Heights, Ohio

[73] Assignee: The Mogul Corporation, Solon, Ohio

[21] Appl. No.: 17,573

[22] Filed: Feb. 24, 1987

[51] Int. Cl.$^4$ .................. B67D 5/60; F16L 37/28
[52] U.S. Cl. .................. 222/464; 222/382; 222/189; 251/149.6
[58] Field of Search .......... 222/382, 189, 464; 251/149.6, 149.7, 149.1

[56] References Cited

U.S. PATENT DOCUMENTS

| | | | |
|---|---|---|---|
| 1,705,392 | 3/1929 | Bohling | 222/382 |
| 1,938,174 | 12/1933 | Davis | 222/464 X |
| 2,083,964 | 6/1937 | Schulz | 222/464 X |
| 2,223,012 | 11/1940 | Wanderski et al. | 222/464 X |
| 2,576,740 | 11/1951 | Wilson | 222/464 U X |
| 3,050,218 | 8/1962 | Harvey | 222/464 X |
| 3,173,586 | 3/1965 | Pawson | 222/464 X |
| 3,422,448 | 1/1969 | Johnston | 222/464 X |
| 3,486,730 | 12/1969 | Potash | 251/149.7 |
| 3,578,219 | 5/1971 | Berry | 222/464 X |
| 4,114,782 | 9/1978 | Berry | 222/383 X |
| 4,436,125 | 3/1984 | Blenkush | 251/149.6 X |
| 4,445,539 | 5/1984 | Credle | 251/149.6 X |
| 4,548,344 | 10/1985 | Hestehave et al. | 222/464 |
| 4,613,112 | 9/1986 | Phlipot et al. | 251/149.6 |

Primary Examiner—Kevin P. Shaver
Attorney, Agent, or Firm—Pearne, Gordon, McCoy & Granger

[57] ABSTRACT

A device for safely transporting, storing, and dispensing chemicals from a drum, including an adapter which fits in the top of a drum, a foot valve near the bottom of the drum, and tubing connecting the adapter and the foot valve. The adapter has a body which is sealingly threadedly engaged with the drum and has a cap which is threaddedly engaged with it. An adapter fitting has a bore therethrough connecting the adapter body to the tubing, and further has a connecting device for a quick-connect fitting. The foot valve has a body with a check valve which permits flow of chemicals only from and not into the drum. A foot valve connects the foot valve body to the tubing. A quick-connect fitting that is normally closed is adapted to engage the adapter by a spring-loaded ring which interacts with a recess. A manually operated release mechanism for the ring is connected thereto.

5 Claims, 3 Drawing Sheets

ADAPTER ASSEMBLY FOR STORAGE CONTAINERS

BACKGROUND OF THE INVENTION

In the shipping, storing, and dispensing of chemicals many problems are encountered. The chemicals themselves are often highly regulated and/or corrosive and must be handled carefully. Spillage in particular, must be avoided in order to prevent damage to property and injury to people. Accordingly, the drums in which the chemicals are shipped must be tightly sealed.

The careful shipping and storing of chemicals is oftentimes at odds with the necessity of easy accessibility for dispensing the chemicals for their final use. That is, if the drums are tightly sealed, considerable effort, time, and expense must often be expended to open the drum, insert an acceptable dispensing device, and eventually reseal the drum. Needless to say, it would be highly desirable to have a drum and dispenser which can be used to ship and store chemicals and yet easily and safely dispense them.

After a drum has been emptied of its chemical, it is usually necessary to remove the dispensing device, carefully clean the drum according to proper safety regulations in order not to harm the user or environment, reseal the drum, and dispose of the drum in a proper way that does not harm the environment. This process has substantial disadvantages. In particular, the proper cleaning of the drums and dispensing device is oftentimes beyond the capabilities of the end user. The cleaning chemicals and equipment may not be readily available and a place to dispose of the drums is usually difficult to find. The cleaning and disposal procedure is also time-consuming and expensive.

An additional problem that the end user has occurs when disconnecting tubing from a drum after the chemical has been emptied. Chemical in the disconnected tubing has a tendency to leak out. Although small amounts of chemicals are involved, such chemicals may be hazardous and, at best, the loss of such chemicals is wasteful.

This invention provides a solution to the above-noted problems. In particular, it provides a dispensing device for use with a standard drum so that shipping, storage, and dispensing of chemicals, as well as the resealing of the drums, may be safely and efficiently carried out. The dispensing device is designed to be placed in the drum at the factory and remains there during shipment, storage, dispensing of the chemical, and return of the drums. That is, this invention includes a device which alternately may be used to seal a chemical drum, dispense the chemicals inside and then reseal the drum. Accordingly, the present device may be easily resealed and left with the drum, and returned to the manufacturer, where it may be cleaned and reused.

The present invention further includes an adapter on the top of the drum that may be tightly sealed with a cap or, alternately, connected to a quick-connect valve for dispensing the chemical. The adapter is operatively attached to tubing which leads to a foot valve inside and at the bottom of the drum. The quick-connect valve fitting is so designed that it is only open when connected with the adapter which is connected to the drum. When removed from the adapter, it automatically closes the line and stops any residual drainage from the line.

As particularly noted in U.S. Pat. No. 4,548,344 to Hestehave et al., other dispensing devices have had relatively complex designs which have required that they be inserted and removed each time the drum is reused. As particularly noted therein, the dispensing means is not adapted to stay with the drum during shipment and storage. This is the type of device which needs repeated cleaning and presents an unnecessarily hazardous step in the use of the chemicals.

SUMMARY OF THE INVENTION

This invention includes a dispensing device for safely transporting, storing, and dispensing chemicals from a drum having a top and bottom. An adapter fits in the top of the drum in a fluidtight fashion. A foot valve at the bottom of the drum and tubing connecting the adapter and foot valve permits fluid to pass therebetween from the drum but not into it. The adapter includes an adapter body which is connected to the tubing and a means for connecting it to an external fitting. The adapter body further includes a means for sealing a bore passing through it against any fluids passing in either direction. The foot valve includes a valve body having a valve bore passing therethrough, and also includes a check valve which prohibits the chemical from passing into the drum. A fitting is designed to be attached to the adapter so that chemicals may be withdrawn from the drum. The fitting is designed to be easily removed from the adapter after the drum has been emptied so that the adapter can once more be sealed.

DETAILED DESCRIPTION OF THE DRAWINGS

Figure 1:
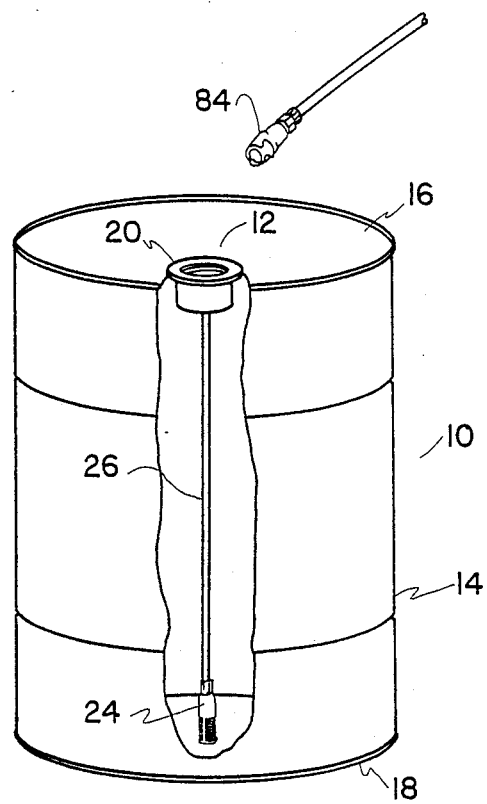
FIG. 1 is a partially cut-away view of a drum illustrating the device of the present invention.

As generally shown in FIG. 1, this invention includes a drum 10 having a device 12 for safely transporting, storing, and dispensing chemicals. The drum 10 is the type of drum commonly used for chemicals having cylindrical sides 14, a top 16, and a bottom 18. The device 12 mounted in the top 16 includes an adapter 20, foot valve 24, and tubing 26 connecting them. They are made of a material which is impervious to the chemical in the drum. One such material is polyethylene.

Figure 2:
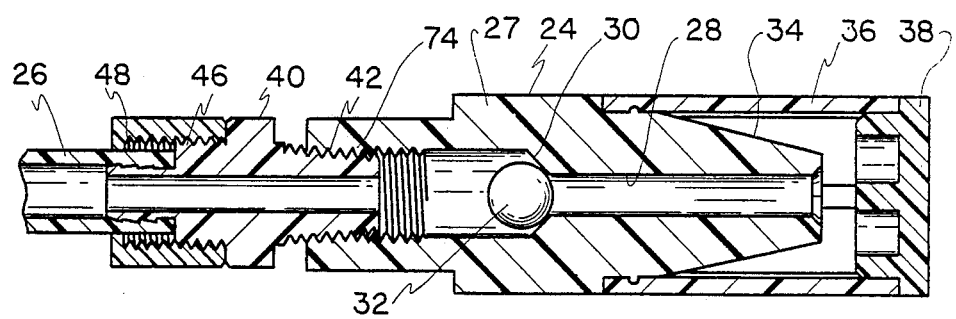
FIG. 2 illustrates the foot valve of this invention.

As illustrated in FIG. 2, the foot valve 24 includes a valve body 27 having a bore 28 therethrough. The bore 28 includes a seat 30 on which a ball 32 rests. The ball 32 and seat 30 functionally make up a check valve so that fluid will only flow, as viewed in FIG. 2, from right to left. As used in the drum, it will only flow in the upward direction, or out of the drum.

The body 27 has a tapered portion 34 which is surrounded by a screen 36 which acts as a filter for the incoming chemicals. A bottom 38 is fitted into the screen 36 and the fitting. Other embodiments of the details of the valve body will be obvious to one skilled in the art.

A fitting 40 has a threaded male portion 42 acting in combination with a female threaded portion 44 of the body 27 to sealingly engage it and permit fluid flow through a common bore. The fitting 40 also has male threads 46 which act in combination with the female threads 48 of a ring 50 for holding one end of a piece of tubing 26 therein in a fluidtight arrangement. Although it may not be specifically mentioned, all connections discussed herein should be fluidtight for obvious reasons.

Figure 4:
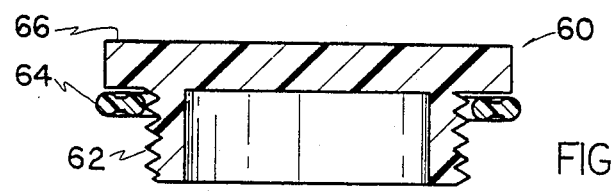
FIG. 4 illustrates a cap to be used in conjunction with the adapter.
Figure 5:
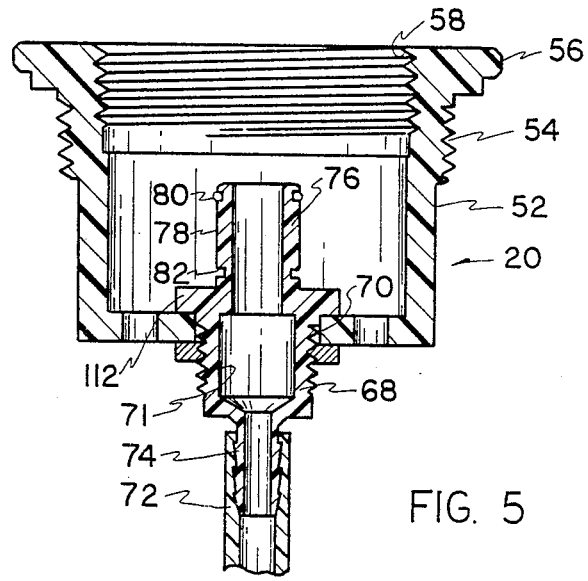
FIG. 5 illustrates the adapter of this invention.

FIG. 5 illustrates the adapter 20. It includes an adapter body 52 with male threads 54 sealingly and threadedly engaging an aperture in the top of the drum 10. A flanged top portion 56 of the adapter body 20 also acts as an engagement mechanism with the drum. Alternate means of attaching the adapter, such as a ring coming from underneath the drum head, may also be used to hold the adapter in place. Female threads 58 in the body 52 receive a cap 60 (FIG. 4) which also forms part of the adapter 20. Male threads 62 are sized to threadedly engage the female threads 58. A ring seal 64 is located between a top flange 66 of the cap 60 and the top flange 56 of the adapter 20. The seal 64 ensures that there will be no liquid spillage or seepage from the drum during shipment and storage. The cap 60 is held firmly in place and there is no practical way in which the chemical can bypass it.

An adapter fitting 68 is held in place at an opening 70 in the body 52. The fitting 68 has a bore 71 through which the chemical may pass. The bore has different diameters, as illustrated therein, so that tubing 72 may fit over the teeth 74 and be held in a fluidtight connection. The fitting 68 further includes a connecting means 76 which includes a cylindrical body 78 having a sealing O-ring 80 and a locking recess 82.

Figure 3:
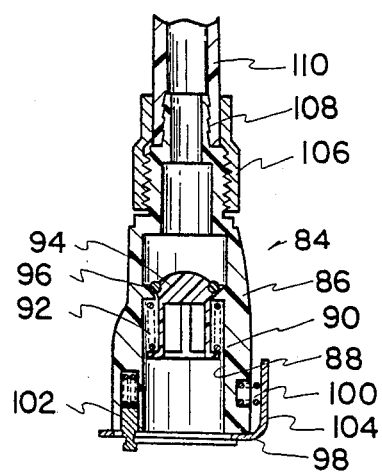
FIG. 3 illustrates the quick-disconnect fitting of this invention.

The fitting for attachment to the adapter is illustrated in FIG. 3 and shown generally as 84. Fitting 84 is shown in a "rest" position, and includes a body 86 having a bore 88 therethrough. A spring-biased plunger 90 is located in the bore 88 and held in place by any conventional means. A spring 92 pushes the plunger downwardly into a sealing position, as illustrated in FIG. 3, which allows no passage of liquid therethrough. A seal 94, held in place by an O-ring 96, prohibits any chemical from passing to the bore above the plunger.

A lock ring 98 is located near the bottom of the body 86 and is spring-biased by means of a spring 100 and held in position by a spring-biased pin 102. As illustrated in FIG. 3, the lock ring 98 is biased to the right, which effectively holds the ring in alignment with the bore 88. A tab 104 is designed so that it is accessible to the end user for releasing the lock ring from its conventional resting place in the recess. A sleeve 106 is threadedly engaged with a portion of the body and works in combination with flanges 108 to hold the tubing 110 in fluidtight connection.

Figure 6:
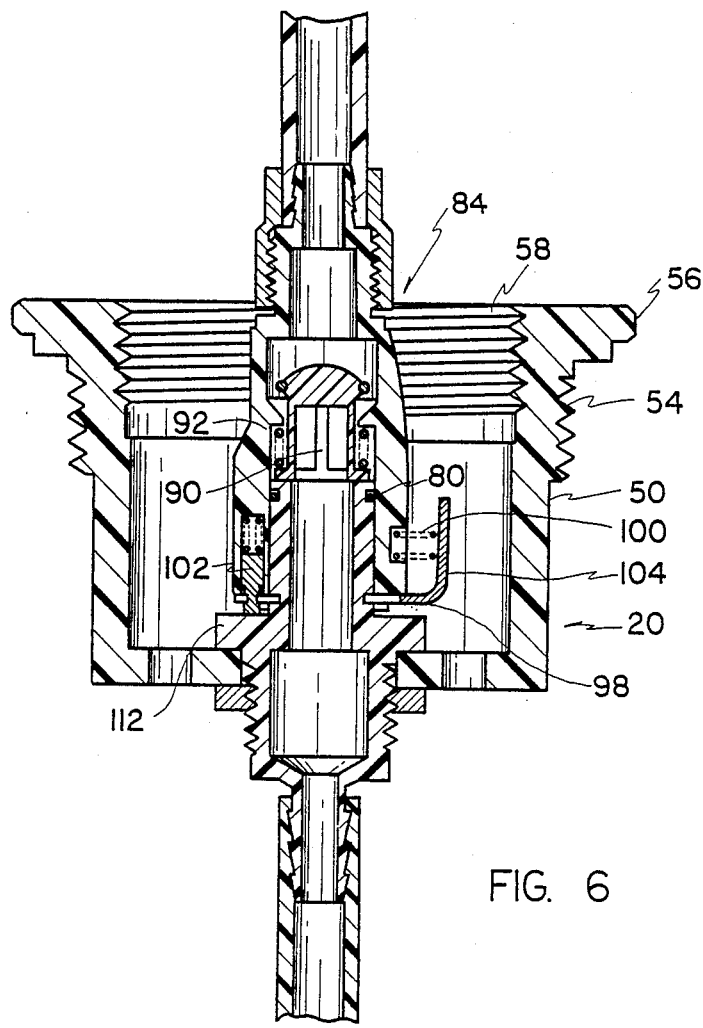
FIG. 6 illustrates the quick --disconnect fitting and the adapter when coupled together.

During shipment and storage, a drum would have the cap 60 installed. When the drum 10 having the device 20 is ready to dispense chemicals, the cap 60 is removed. The quick-disconnect fitting 84 is then pushed onto the adapter 20. The resulting structure is illustrated in FIG. 6. As the fitting 84 moves downwardly, the plunger 102 engages the adapter at a flange 112 and moves upwardly. As it does so, it releases the lock ring 98 so that it can move to the left as illustrated in FIG. 6, thus engaging the locking recess 82. In place, it is so engaged that the plunger 90 has now moved upwardly and permits liquid to pass by the seal 94, and thus exit from the drum.

After the chemical has been dispensed, it is a simple matter for the end user to simply push against the tab 104, thus releasing the retaining ring and removing the quick-connect fitting. The plunger 102 moves downwardly and locks the ring 98 in a position out of alignment with the bore 88. As this occurs, the plunger again moves downwardly and seals the passage of fluid out of the quick-connect fitting. Thus, no chemical is permitted to spill after it is disconnected. Harm to the end user and contamination are thus avoided.

Once the fitting 84 has been disconnected, the cap 60 is threaded back into place. The drum, with its device, is then shipped back to the manufacture for reuse. Accordingly, there is no need to clean either the drum or the dispensing apparatus. The efficiencies and safeguards are significant to the end users.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A dispensing device and a drum for safely transporting, storing, and dispensing chemicals, the drum having a top and bottom, comprising:

an adapter fitted in the top of the drum in a fluidtight fashion;

a foot valve and tubing disposed between the adapter and foot valve so that fluid may pass therebetween through the tubing and so that the foot valve will be located near the bottom of the drum;

the adapter including an adapter body, first means for connecting the adapter body to the tubing, and second means for connecting a fitting to the adapter body so that fluid may pass through the tubing to the adapter body, said second connecting means being disposed within a recess of the adapter body;

the adapter body further including threads on the exterior thereof to engage the top of the drum and interior threads within said recess to receive a cap, the cap, when engaged, preventing chemicals from passing out of the drum, the adapter further including a cylindrical connecting means;

the foot valve including a valve body having a valve bore therethrough and a check valve therein to prevent flow in one direction and a filter;

the fitting adapted having one end to connect to the adapter body by said second means for conencting and having a conduit on a second end, the fitting having a passageway and a plunger at said one end for the passageway that is biased to a closed position on a seat until the fitting is connected to the second means for connecting on the adapter body where the plunger engages a cylindrical portion of the second connecting means and moves away from the seat; and the fitting further including a spring-biased ring that latches in place in a locking recess on the second connecting means when the fitting and second connecting means are pressed together;

whereby the drum may be shipped with the cap threadedly engaged with the adapter in order to prevent chemical spillage, the cap may be removed and the fitting coupled to the adapter by pressing it on the second connecting means, the chemical may be removed safely through the filter in the foot valve along the tubing and out of the adapter and drum, and the fitting may be safely disconnected from the adapter since chemical in the conduit connected to the fitting is prevented from flowing out by said plunger when the fitting is disconnected, and the cap may be replaced on the adapter.

2. The dispensing device of claim 1, wherein the fitting further includes a tab operatively connected to the locking ring which releases the locking ring when it is pressed.

3. The dispensing device of claim 1, wherein the foot valve includes a seat in the valve bore and the check valve comprises a ball adapted to interact with the seat so that chemicals can only flow outwardly from the drum.

4. The dispensing device of claim 3, wherein the foot valve further includes a foot valve fitting for fluidtight engagement with the tubing.

5. The dispensing device of claim 4, whereby the filter comprises a screen that covers an opening in the foot valve so that the chemical is filtered before it is drawn through the foot valve and out of the drum.

* * * * *